United States Patent [19]

Mack et al.

[11] Patent Number: 4,496,443

[45] Date of Patent: Jan. 29, 1985

[54] METHOD FOR ELECTRICALLY INTRODUCING SUBSTANCES INTO LIQUID SOLUTION

[76] Inventors: Michael H. Mack, 15111 Pipeline St.; Sterling C. Corley, 13149 6th St., both of Chino, Calif. 91710; Leland G. Cole, P.O. Box 11812, Santa Ana, Calif. 92711

[21] Appl. No.: 386,358

[22] Filed: Jun. 8, 1982

[51] Int. Cl.³ .............................................. C25B 1/20
[52] U.S. Cl. .................................. 204/130; 204/100; 47/62; 47/DIG. 10
[58] Field of Search ................ 204/100, 130; 99/451; 47/62, DIG. 10

[56] References Cited

U.S. PATENT DOCUMENTS

| | | | |
|---|---|---|---|
| 3,074,862 | 1/1963 | Sudrabin | 204/100 |
| 3,705,090 | 12/1972 | Bergeron et al. | 204/100 |
| 3,785,943 | 1/1974 | Eberle et al. | 204/100 |

Primary Examiner—R. L. Andrews
Attorney, Agent, or Firm—Knobbe, Martens, Olson & Bear

[57] ABSTRACT

A method for infusing substances into liquids through the use of electrolysis allows mixtures having controlled concentrations at predetermined proportions to be produced. The liquids with infused substances may be used as feedstuff for plants and/or animals; e.g., water mixed with magnesium compounds may be used to enrich the diets of plankton and/or cattle. The electrolysis apparatus allows the infusion to occur continuously into a flowing stream of liquid, allows the rate of infusion to be controlled, to a predetermined concentration regardless of the flow rate of the stream and affords means of self-cleaning to the electrodes to maintain the electrolytic reactions at high coulometric efficiency.

8 Claims, 3 Drawing Figures

U.S. Patent   Jan. 29, 1985   4,496,443
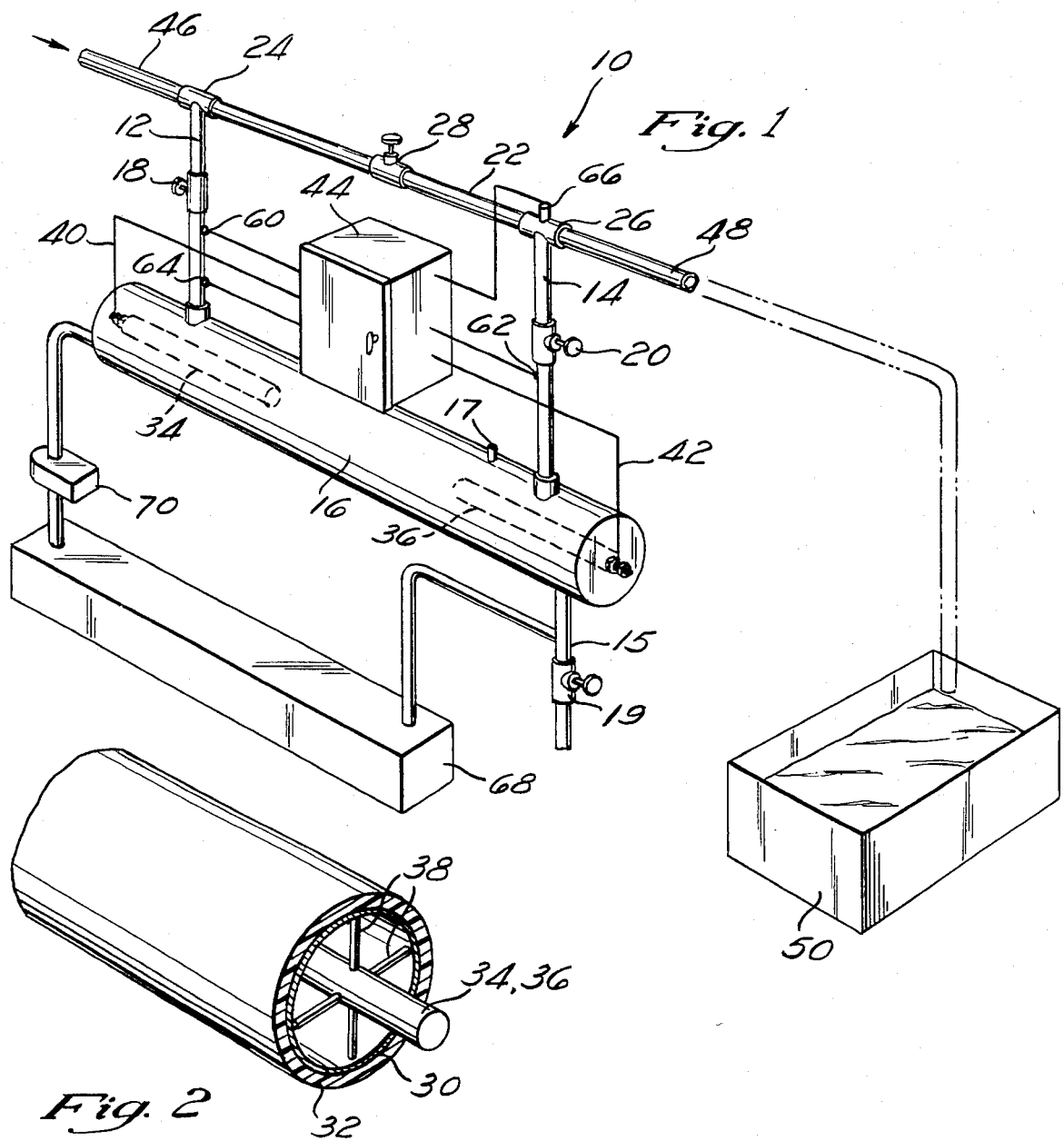
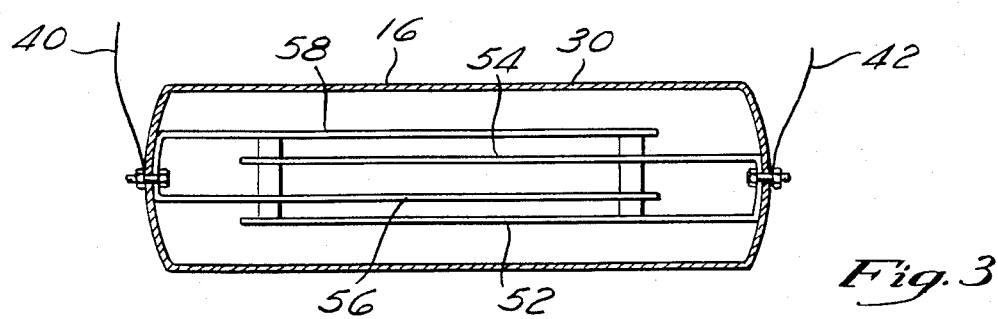

METHOD FOR ELECTRICALLY INTRODUCING SUBSTANCES INTO LIQUID SOLUTION

CROSS REFERENCE TO RELATED APPLICATIONS

The disclosure of U.S. Pat. No. 4,290,868, issued Sept. 22, 1981 entitled, "Iron Plumbing Corrosion Minimizing Method" is incorporated herein by reference.

FIELD OF THE INVENTION

The invention relates to a process of fortifying a solution through the use of a consumable electrode, an example of which is enriching water with magnesium compounds to provide foodstuff for plankton and/or cattle.

BACKGROUND OF THE INVENTION

Magnesium is one of the essential elements to all organisms, both plant and animal. Thus, magnesium is necessary for the organism's biochemical reactions. In man, magnesium occurs in an amount less than about 0.01 percent. It is therefore not surprising that a magnesium deficiency in an organism will produce adverse effects.

The present inventor believes that many disease conditions heretofore attributed to a variety of unrelated causes may initially be precipitated by inadequate amounts of utilizable magnesium. There is evidence that magnesium plays an important role in increasing resistance to disease in general. For example, tentany associated with magnesium deficiency is a well recognized problem in lactating beef cows.[1] Moreover, dairymen have observed for years that cows at or near calving are particularly susceptible to a disease known as "milk fever". Milk fever usually affects the higher-milk-producing cows in a herd. It is fairly well established that "milk fever" is caused by hypocalcemia, i.e., low calcium levels. The inventors believe that an inadequate supply of magnesium will predispose an animal to hypocalcemia; therefore, providing adequate magnesium in utilizable form will better mobilize the calcium stores within the animal and have the effect of preventing hypocalcemia in most animals.

1. JAVMA Volume 172, Number 4, page 496.

Abundant magnesium makes the body's store of calcium better mobilized at the onset of lactation at parturition. As a result, cows which are magnesium deficient can have a significant economic loss since a single case of milk fever can cause a 3400 to 3600 lbs., or more, decrease in fat-corrected milk production per year. There is, therefore, a definite need for an effective process which will provide magnesium in a utilizable form to animals such as a dairy cow. The cows may have no adequate source of magnesium due to modern methods of feed production and the treatment of soil with fertilizers that rob the grazing lands of magnesium.

The invention assures the abundant production of more utilizable magnesium than the prior art, controlled in a way to economically optimize the safe performance of the generator.

Prior apparatus have been constructed which provide consumable electrodes in water lines in order that the electrodes are preferentially corroded and prevent corrosion of the water lines themselves.

SUMMARY OF THE INVENTION

The disclosed process treats a magnesium deficiency in animals by introducing magnesium into the feed water.

The apparatus disclosed herein may also be used to introduce other substances into water using an electrolytic process. Specifically, the process equipment establishes an electrolylic cell in the water which comprises, in one embodiment, an anode of magnesium and a cathode of a material having such a low electrode potential that the magnesium will be preferentially oxidized. In aqueous solution the oxidized magnesium forms magnesium hydroxide and, in turn, magnesium bicaronate, magnesium carbonate and/or hydrates thereof in a combined dissolved, suspended and or colloidal state (hereinafter referred to generally as "magnesium hydroxide"). The "magnesium hydroxide" is in the form of gelatinous lyophilic colloids so that the solids are in a finely divided state uniformly distributed throughout the water and stabilized by an affinity between the water and the solids.

In order to control and increase the rate of oxidation and to remove the film of corrosion products an auxilliary direct electric current is supplied to an electrolytic cell, consisting of magnesium anode(s), an inert cathode, and electrolyte.

The treated water containing the colloidal "magnesium hydroxide" is then fed to the animals, in their standard drinking water system and troughs. Cows whose diet has included such water are on the average healthier and produce more milk. Furthermore, the animals have shown a preference for water thus treated. It is believed that this preference is due at least in part to the enhanced green coloration produced in the feed water due to increased growth of algae which is caused by the added "magnesium hydroxide".

It has been found that if dolomite, i.e., magnesium carbonate, is fed to cattle, the beneficial results obtained through the use of the magnesium fortified water are not achieved. It is therefore postulated that the magnesium produced in the invention in the form of a colloidal suspension of magnesium hydroxide and its electrolytically-related compounds are more highly utilizable by the animal's metabolism than is dolomite.

The inventive process is easy to install, requiring only the establishment of an electrolytic cell in the flow path of the animal's water feed line. In short, the device safely and efficiently produces a highly utilizable source of magnesium for which the animals seem to have a natural affinity, and which when imbibed produces benefits to the health of the animal and increases the animal fat-corrected-milk production.

DESCRIPTION OF THE DRAWINGS

FIG. 1 is a perspective of the electrolytic cell employed in the inventive process;

FIG. 2 is a fragmentary sectional view illustrating the anode and cathodes within the cell of FIG. 1.

FIG. 3 is a view of an alternative arrangement of electrodes within the cell.

DETAILED DESCRIPTION OF A PREFERRED EMBODIMENT

Referring to FIG. 1, a device 10 is shown for generating and introducing magnesium hydroxide, its bicarbonate, its carbonate and related hydrates into an existing water line. The device has an upright inlet pipe 12 and an upright outlet pipe 14 which engage a cylindrical tube 16 at their lower end so that a flow path is created from the inlet pipe 12 through the interior of the tube 16 and out the outlet pipe 14. The tube 16 acts as a reaction vessel in which an electrode may be electrolytically decomposed in order to introduce the substance into the liquid flowing through the tube 16. The inlet and outlet pipes 12, 14 are mutually parallel and engage the tube 16 at essentially right angles. The inlet pipe 12 has an inlet valve 18 for controlling the flow of water therethrough. Similarly, the outlet pipe 14 has an outlet valve 20. A drain pipe 15 is connected to the tube 16 adjacent the outlet pipe 14 and has a drain valve 19 mounted therein to allow liquid to be drained from the tube 16.

The pipes 12, 14 engage an upper pipe 22 through T-joints 24, 26. The upper bypass pipe 22 is essentially parallel to the generator tube 16, and has a substantially smaller inner diameter than the tube 16. The upper pipe 22 has a bypass valve 28 located between the pipes 12, 14 that controls the flow of water through the upper pipe 22.

Referring to both FIGS. 1 and 2, in this embodiment, the tube 16 is an essentially hollow cylinder having a thin, annular sleeve of iron 30 which is surrounded by a thicker outer wall 32 which, in the preferred embodiment, is formed of polyvinylchloride. The tube 16 is fitted with a pressure relief valve 17 which allows hydrogen produced inside the tube 16 to escape should the pressure inside the tube 16 exceed a predefined maximum pressure. The pressure relief valve 17 also automatically vents the inside of said tube 16 if the water pressure exceeds the predefined maximum pressure, and thus the valve 17 protects against explosions due to hydrogen gas accumulations and damage to the tube 16 due to excessive water pressure. The predefined maximum pressure for the valve 17 is set a few psi above the normal range of water pressure.

Mounted within the inner hollow core of the tube 16 at each end thereof is a left magnesium rod 34 and a right magnesium rod 36. The rods 34 and 36 serve as an anode electrode, and are consumed in an electrolytic process in which the substances contained in the rods 34 and 36 become introduced or infused into the liquid in the tube 16. The magnesium rods 34, 36 are maintained in a concentric relationship with the iron sleeve 30 by means of plurality of tubular insulating inserts, referenced generally as 38 in FIG. 2, which diametrically span the iron sleeve 30 and extend through or into the magnesium rods 34, 36. Adjacent inserts are mutually perpendicular. The extreme ends of the magnesium rods 34, 36 are electrically connected to left and right electric lines 40, 42 which are in turn connected to a control box 44. The box 44 provides a source of direct current to the magnesium bars or electrodes 34, 36 in the preferred embodiment and may contain other instrumentation hereinafter described.

An input end 46 of the upper pipe 22 is connected to an existing water line (not shown). An output end 48 feeds into a reservoir or trough 50 (which may include a plurality of individual reservoirs) which is used to provide animals, such as dairy cows, drinking water.

With the left and right valves 18, 20 closed and the bypass valve 28 open, water flows directly through the upper pipe 22 from the water line to the reservoir 50 without entering the tube 16. However, with the bypass closed, water will flow from the source through inlet pipe 12, then through the tube 16 and finally through the outlet pipe 14 and out to the reservoir 50.

It will be understood that the tube 16 forms an electrolytic cell having anodes formed of the magnesium rods 34, 36 and a cathode formed of the iron sleeve 30.

Referring next to FIG. 3, an alternative arrangement of electrodes inside the tube 16 may include spaced-apart magnesium plates 52, 54, 56 and 58 which are interleaved so that plates 52 and 54 are connected together as one electrode, and the plates 56 and 58 are connected together as another electrode. As described further below, the power applied to the plates 52 and 54 and plates 56 and 58 is automatically alternated in polarity so that each plate acts alternately as an anode and as a cathode. The plates 52, 54, 56 and 58 are mounted vertically upright in order to prevent the accumulation of sediment between the plates and thus to maintain the operating efficiency of the device 10. The plates 52, 54, 56 and 58 are interleaved and parallel so that plates of opposite polarity are mounted next to each other and the efficiency of removal of material from each plate is enhanced. Insulators 60 and 62 are mounted between the plates 52, 54, 56 and 58 in order to hold the plates in a unitary mechanical assembly and in order to insulate each plate from the adjacent plates.

In basic solution, the electrode potential at standard conditions, $E^0$, of magnesium is as follows; for the reaction:

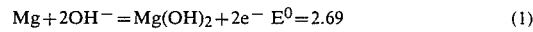

$$Mg + 2OH^- = Mg(OH)_2 + 2e^- \quad E^0 = 2.69 \qquad (1)$$

The highly positive electrode potential for equation (1) means that the reaction as written has a strong tendency to proceed, i.e., the reaction has a high driving force to the right.

In contrast, the standard electrode potential for iron in basic solution is as follows:

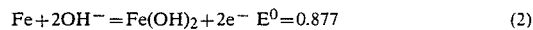

$$Fe + 2OH^- = Fe(OH)_2 + 2e^- \quad E^0 = 0.877 \qquad (2)$$

Because equation (1) is more highly positive than equation (2), the magnesium anode will be preferentially oxidized vis a vis the iron electrode. The iron electrode in this cell is, therefore, essentially inert and serves as a cathode, the site of the reduction reactions which occur in the cell as will be described.

It will be understood that the cathode need not be composed of iron, but rather could be any element with a sufficiently small electrode potential vis a vis magnesium as to be essentially inert. Other satisfactory materials would be nickel, platinum, cobalt, air depolarized carbon electrode or the like.

The magnesium will reduce any dissolved oxygen in the water according to the half-cell reaction:

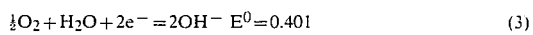

$$\tfrac{1}{2}O_2 + H_2O + 2e^- = 2OH^- \quad E^0 = 0.401 \qquad (3)$$

Combining equations (1) and (3) produces the following net cell reaction:

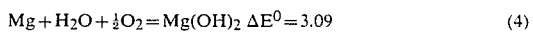

$$Mg + H_2O + \tfrac{1}{2}O_2 = Mg(OH)_2 \quad \Delta E^0 = 3.09 \qquad (4)$$

As the oxygen is dissipated, the magnesium will also reduce the hydrogen atoms in water to hydrogen gas according to the following half cell reaction:

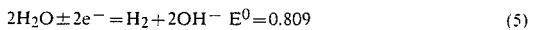

$$2H_2O \pm 2e^- = H_2 + 2OH^- \quad E^0 = 0.809 \qquad (5)$$

Combining equations (1) and (5) produces the following net cell reaction:

$$Mg + 2H_2O = Mg(OH)_2 + H_2 \quad \Delta E^0 = 1.88 \qquad (6)$$

Thus, as water flows through the tube 16 the magnesium rods 34, 36 will be oxidized and dissolve while the iron sleeve 30 remains essentially unchanged.

The magnesium compounds which are produced according to equation (4) and (6) and subsequent reactions may be dissolved in the water up to their saturation concentration for the temperature of the water stream and suspended in the form of a gelatinous, lyophilic colloid. It should be understood that other magnesium compounds may be formed during the operation of the electrolytic cell depending upon the pH and constituency of the incoming water. For example, free carbon dioxide in the inlet water may be neutralized producing soluble magnesium bicarbonate:

$$2CO_2 + Mg(OH)_2 = Mg(HCO_3)_2 \qquad (7)$$

At higher pH the continued formation of magnesium hydroxide in the presence of carbon dioxide produces magnesium carbonate by combining with the magnesium bicarbonate of equation (7):

$$Mg(HCO_3)_2 + Mg(OH)_2 = 2MgCO_3 + 2H_2O \qquad (8)$$

The magnesium carbonate remains in solution until, upon continuous production of magnesium hydroxide, the solubility of basic magnesium carbonate is exceeded. A visible flocculant precipitate will form as more magnesium is added—as $Mg(OH)_2$, $Mg(HCO_3)_2$, and $MgCO_3$.

In short, the water which flows from the tube 16 to the reservoir 50 may contain a number of different magnesium compounds in solution, suspension and/or colloidal suspension, all derived from the oxidation of the magnesium anode in the electrolytic cell.

The control box 44 provides direct current to the magnesium anode which increases the driving force of the net cell reaction. It is, therefore, possible to control the rate of the magnesium oxidation by controlling the amount of current supplied.

In a preferred embodiment, a pair of magnesium electrodes or plurality thereof (one set first serving as anodes, the other as cathodes) is periodically reversed electrically (the first set now serving as cathodes, the second set as anodes), thus completely reversing the electrochemical reactions at the electrode/water interface, effecting the efficient removal of products of the previous cycle's reactions, thus maintaining a higher coulometric efficiency, more reproducible magnesium concentrations for prolonged operations. In this preferred embodiment, the steel, or other, cathode liner within the generator chamber 16 is removed, with the added benefit of minimization of any adherent coating thereto. The reversing current may also be used to inhibit or reduce the formation of a film of magnesium oxide and/or hydroxide over the magnesium anode which could slow or even terminate the cell reaction.

The device 10 shown in FIG. 1 may optionally be equipped with an input magnesium concentration detector 60 and output magnesium concentration detector 62, both of which are connected to power control circuitry inside the power box 44. The function of the input detector 60 is to measure the concentration of magnesium in the water entering through the input pipe 12. The function of the output detector 62 is to measure the concentration of magnesium in the water leaving through the output pipe 14. The function of the control circuitry in the box 44 is to control the flow of electrical power through the lines 40 and 42 so that the concentration of magnesium added to the water by the device 10 is held substantially constant. Although water entering through the inlet 46 may contain magnesium in some form, it is important that the amount of magnesium added by the device 10 be of a sufficient size in order to obtain the biological benefits. It is believed that electrolytically infused magnesium provides greater health benefits than the magnesium otherwise present in water. Another possible operating mode may be implemented by control circuitry inside the box 44 by sensing the concentration measured by sensor 62 and controlling the power supplied through lines 40 and 42 to cause the concentration of magnesium in the water flowing through the outlet pipe 14 to be held substantially constant. The magnesium concentration detectors 60 and 62 are preferably commercially available detectors such as glass electrode pH detectors, total dissolved solids (TDS) detectors which measure the electrical conductivity of the water, or nephelometers which measure the optical density (light transmission) of the water. The control circuitry inside the power box 44 for providing differential proportional control (by comparing sensors 60 and 62) or for providing proportional control (using sensor 62 alone) may include commercially available differential pH instrument meters such as Leeds & Northrup type 7773 or 7075, or Electromax V Model 6002, or Lakewood model 41-5331.

The device 10 may also include a flow rate sensor 64 connected to the power control circuitry insie the box 44. The flow sensor 64 is mounted in the inlet pipe 12 in order to measure the flow of water through the pipe 12. The control circuitry inside the box 44 responds to the flow measured by the sensor 64 in order to automatically cut off the electrical power supplied through the lines 40 and 42 at low fluid flow rates so that the undesirable production of scale on the cathode 30 at low flow rates is prevented. The flow rate sensor 64 is preferably a commercially available vane-type sensor which contains a switch that is activated in response to fluid flow.

The device 10 may also include a hydrogen detector 66 mounted in the upper end of the outlet pipe 14 and connected to the control circuitry inside the box 44. The function of the hydrogen detector 66 is to detect the presence of gaseous hydrogen inside the outlet pipe 14 due to the electrolytic chemical reactions inside the tube 16. It is desirable to avoid an accumulation of hydrogen gas because such gas creates a danger of explosion. The control circuitry inside the box 44 uses the detector 66 in order to detect hydrogen gas, and cuts off the supply of electrical power through the lines 40 and 42 when such gas is detected. The hydrogen detector 66 preferably is a commercially available thermal conductivity probe which uses a heated platinum coil to detect the presence of hydrogen gas.

The device 10 shown in FIG. 1 may be equipped with a hydraulic accumulator tank 68 connected to the drain pipe 15 which is adjacent the outlet pipe 14. A circulation pump 70 is connected between the tank 68 and the tube 16 so that fluid may flow in a circular path through the tube 16, the tank 68, and the pump 70. The pump 70 causes sediments (such as sand and materials released from the electrodes) which form inside the tube 16 to be driven into the tank 68 where settling will occur so that sediments do not interfere with the electrolysis operation occuring in the tube 16. The pump 70 also causes substances released from the anodes inside tube 16, which may be subsequently drawn through the tank 68, to be macerated in the pump 70 so that the substances are more readily infused into the liquid in the reaction tube 16. It is preferable that the output of the pump 70 be directed horizontally along the length of the inside bottom of the tube 16 so that an intense flow of liquid flushes any sediments out of the bottom of the reaction tube 16 and into the accumulator tank 68. The pump 70 and tank 68 perform a particularly important function when the rate of flow of water through the pipes 12 and 14 is low, by insuring that sediment does not build up inside the reactor tube 16 and short out the electrodes.

An alternative arrangement for the tube 16 may include mounting the tube 16 vertically so that sediments settle to the bottom of the tube 16, away from the anode and cathode, and so that any hydrogen gas produced during electrolysis bubbles to the top of the tube 16 where it may be removed as transported effluent downstream. Substances released from the anode would settle to the bottom of the tube 16 but could be ground and recirculated by the force of the incoming water in a vertically mounted tube 16, or may be recirculated by a pump similar to pump 70 described above.

Rather than using a metal cathode, such as the iron tube 30, a cathode may be constructed as an air depolarized carbon cathode of the type commercially available from Union Carbide. Such a cathode consists of a porous carbon element which may be mounted inside the tube 16 and which is supplied with an air pump so that air may be pumped through the carbon element. Such an air depolarized carbon cathode is advantageous in avoiding the problem of the buildup of scale on the cathode, since the flow of air prevents such scale from forming.

The device 10 may be equipped with internally mounted brushes inside the tube 16 so that the accumulation of scale on the inside surface of the cathode tube 30 is prevented by brushing which automatically cleans off accumulating scale. One way to construct such brushes is to place rotatable brushes inside the tube 16 and rotate the brushes with an electric motor. Another way to construct such brushes is to place rotatable brushes inside the tube 16 and equip the brushes with impeller vanes so that the flow of liquid through the tube 16 impinges on the impeller vanes and automatically rotates the brushes, which thereby cleans the cathode as long as liquid flows through the tube 16.

The anode used in the device 10 is preferably composed of magnesium in order to provide magnesium enriched water for use as a dietary supplement, as described above. However, the apparatus arrangement shown for the device 10 may be used to introduce substances other than, or in addition to magnesium into water using the same type of electrochemical process. The anode may also be composed of a number of substances, such as magnesium mixed with selenium, zinc, aluminum, or manganese, so that a number of dietary supplements may be added to water simultaneously. Therefore, an anode containing a plurality of substances will enrich the water with the substances in accordance with the relative proportions of the substances in the anode.

The electrode arrangement shown in FIG. 3 and described above may be supplied with opposite polarity voltages on the lines 40 and 42 so that one set of the plates (52 and 54 or 56 and 58) acts as an anode and the other set acts as a cathode. A timer may be provided inside the control circuitry of the box 44 to automatically, periodically reverse the polarity applied to he lines 40 and 42 so that the two sets of electrode plates take turns being anodes and cathodes. Such operation is advantageous because any accumulation of scale acquired by a plate when it is a cathode is automatically released into the water when the plate is powered as an anode, and thus efficiency-reducing scale deposits are prevented.

The magnesium rich water in the reservoir 50 is then fed to the magnesium deficient animals such as dairy cattle. It has been found that the cattle prefer the magnesium treated water to their normal drinking water. The effects of the magnesium-rich water on dairy cows were tested, as discussed in the following example.

EXAMPLE 1

Individual cows were randomly selected in a well managed dairy. An average base serum level of magnesium was determined by the atomic absorption method on blood samples from each of these subjects. The average level of magnesium was 1.9 meq./L which is considered to be a low normal level of magnesium for cows.

A new water trough was constructed accessible to the milk string of sixty test subjects. The trough received water fortified with the magnesium derived from the electro-chemical process described herein. General herd management and production records were monitored for the next 3 months.

The results were that the cows in the test milking string preferred the treated water and the general health and production of the entire test herd during the test period was good. From the dairyman's personal recollections of the corresponding period in 1979, he treated at least 20 cases of milk fever at or near calving while less than 5 cows suffered from milk fever during the test period, significantly increasing annualized milk production. In addition the production records for the 3 month test period indicated that the individual milk production values of the subjects improved 0.75% higher than did the milk production values for the remainder of the herd.

Thus during the test period the herd health improved and there was increased milk production with at least 15 less cases of milk fever than in the corresponding period from the previous year.

The fact that the magnesium-rich water is derived from the oxidation of magnesium through the electrochemical process appears to provide a particularly utilizable form of magnesium for the animal's metabolism. Dolomite i.e., magnesium carbonate was fed to dairy cows to determine if the same effects would be observed, which they were not.

A significant additional benefit is manifested by water treated as above described. Plant life, such as algae, often grows naturally in the animal's water reservoirs. Plants, like animals, require magnesium for basic biochemical reactions. In fact, the green pigment of plants, chlorophyl is multi-ring molecular structure centered about a magnesium atom. It has been discovered that the magnesium rich water in the reservoir 50 accelerates the growth of plants such as algae, and more complex plants common to the pasture lands. The plants healthier and greener appearances also seems to attract the animals such as dairy cows who drink from the reservoir 50 who prefer the taste of the algae and other plants so treated. Cows often feed on the plants as well as the drinking water and thus the algae and other magnesium enriched plants may also serve as an important source of magnesium for the animals; contributing to the benefits observed.

What is claimed is:

1. A process for treating magnesium deficiency in organisms comprising:

introducing into feed water ingested by the organism an effective amount of dissolved and suspended gelatinous, lyophilic colloids containing magnesium and its compounds obtained from electrolytically oxidizing a magnesium anode in said water.

2. The process of claim 1 wherein at least one of said colloids is formed from magnesium hydroxide.

3. The process for treating magnesium deficiency in animals comprising:

introducing oxidized magnesium into feed water ingested by the organisms, said oxidized magnesium being derived from electrolytically oxidizing a magnesium anode in said water.

4. A process for treating magnesium deficiency in organisms comprising:

establishing a electrolytic cell in feed water ingested by said organisms, said cell comprising:
   a magnesium anode; either solid, or particulate;
   a cathode formed from a material having a sufficiently low electrode potential that said magnesium anode is preferentially oxidized, providing an auxilliary direct current to said cell to control the rate of magnesium oxidation.

5. The process of claim 4 wherein said cathode is iron.

6. A process for providing dietary supplement to plants comprising:

electolytically oxidizing a magnesium anode in water in order to enrich the water with an effective amount of magnesium; and
   providing the magnesium enriched water to the plants in order to promote the growth thereof.

7. A process for providing dietary supplement to animals comprising:

providing water which has been enriched with magnesium by electrolytic oxidation of a magnesium anode to plants; and
   providing the plants which have been so treated to the animals as feedstuff.

8. A process for providing dietary supplement to animals comprising:

electrolytically oxidizing a magnesium anode in water in order to enrich the water with an effective amount of magnesium; and
   placing the magnesium enriched water in a reservoir so that the growth of plants is promoted, and so that animals may nutritionally benefit by ingesting both the plants and the magnesium enriched water from the reservoir.

* * * * *